United States Patent
Ramamurthy et al.

(12)

(10) Patent No.: US 6,725,848 B2
(45) Date of Patent: Apr. 27, 2004

(54) METHOD OF CONTROLLING EXHAUST GAS RECIRCULATION SYSTEM BASED UPON HUMIDITY

(75) Inventors: Ravishankar Ramamurthy, Inkster, MI (US); Sameer Bhargara, Canton, MI (US); Phillip F. Rimnac, Saline, MI (US)

(73) Assignee: Detroit Diesel Corporation, Detroit, MI (US)

( * ) Notice: Subject to any disclaimer, the term of this patent is extended or adjusted under 35 U.S.C. 154(b) by 181 days.

(21) Appl. No.: 10/052,013

(22) Filed: Jan. 18, 2002

(65) Prior Publication Data

US 2003/0136390 A1 Jul. 24, 2003

(51) Int. Cl.$^7$ .............................................. F02M 25/07
(52) U.S. Cl. .................... 123/568.22; 701/108
(58) Field of Search .................. 123/568.22, 568.21, 123/568.11; 60/602, 605.1, 605.2; 701/108

(56) References Cited

U.S. PATENT DOCUMENTS

| 4,168,683 | A | | 9/1979 | Hata et al. |
| 4,993,386 | A | | 2/1991 | Ozasa et al. |
| 5,089,113 | A | * | 2/1992 | Logothetis et al. ......... 204/425 |
| 5,145,566 | A | | 9/1992 | Logothetis et al. |
| 5,241,937 | A | | 9/1993 | Kanehiro et al. |
| 5,288,375 | A | | 2/1994 | Logothetis et al. |
| 5,597,951 | A | | 1/1997 | Yoshizaki et al. |
| 6,062,204 | A | * | 5/2000 | Cullen .................... 123/568.22 |
| 6,152,118 | A | | 11/2000 | Sasaki et al. |
| 6,209,515 | B1 | | 4/2001 | Gotoh et al. |
| 6,367,256 | B1 | * | 4/2002 | McKee ....................... 60/605.2 |
| 6,575,148 | B1 | * | 6/2003 | Bhargava et al. ........... 123/564 |

FOREIGN PATENT DOCUMENTS

| JP | 58-110851 A | 7/1983 |
| JP | 63-195371 A | 8/1988 |
| JP | 7-103077 A | 4/1995 |
| WO | WO 02/077428 A1 | 10/2002 |

* cited by examiner

*Primary Examiner*—Mahmoud Gimie
(74) *Attorney, Agent, or Firm*—Brooks Kushman P.C.

(57) ABSTRACT

An exhaust gas recirculation system for a compression ignition engine is provided wherein the exhaust gas recirculation is shut off depending upon the sensed or calculated humidity in the intake manifold relative to the dew point of the exhaust/intake air mixture. The humidity of the exhaust/intake air mixture may be measured in the intake manifold, charge air mixer or the ambient humidity may be sensed. If humidity is measured in the air charge mixer or in the ambient air, other factors such as engine speed and load, intake manifold pressure, EGR flow and air/fuel ratio may be used to calculate the humidity in the intake manifold. When the temperature of the mixture in the intake manifold is less than the dew point of the mixture, the engine control strategy may be shut off the EGR to prevent condensation in the exhaust gas recirculation system or engine.

20 Claims, 2 Drawing Sheets

METHOD OF CONTROLLING EXHAUST GAS RECIRCULATION SYSTEM BASED UPON HUMIDITY

BACKGROUND OF THE INVENTION

1. Field of the Invention

The present invention relates to a method of controlling the operation of a condensation reduction system for an exhaust gas recirculation (EGR) system of a compression-ignition internal combustion engine based in part on humidity levels.

2. Background Art

Compression-ignition internal combustion engines may be equipped with EGR systems to reduce NOX emissions. EGR systems include an EGR circuit in which tubing interconnects an EGR cooler, EGR flowmeter, and EGR valve. The EGR circuit components operate in a corrosive environment that is exacerbated by the formation of condensation in the EGR circuit. Gases that condense in the EGR system are acidic and can cause corrosion of the components of the EGR circuit. As exhaust gases cool in the EGR circuit, condensation may form on the interior surfaces of the components of the EGR circuit.

Various condensation reduction or elimination systems are available for use on internal combustion engines including condensation traps, EGR heaters, and the like. Control and operation of active systems may require energy and control logic capacity. Under most normal operating conditions no condensation reduction system is necessary, but prior art systems continuously function regardless of ambient temperature and humidity conditions.

There is a need to eliminate or reduce condensation in EGR systems selectively when ambient temperature and humidity conditions cause condensation to prolong the life of the EGR circuit components by minimizing corrosion. There is a need for a method and apparatus for minimizing operation of condensation reduction systems in an EGR circuit when ambient temperature and humidity conditions do not necessitate condensation reduction.

The above problems and needs are addressed by Applicant's invention as summarized below.

SUMMARY OF THE INVENTION

According to one aspect of the present invention, a method of controlling an internal combustion engine is provided wherein humidity is used to control operation of a system for reducing condensation in the EGR system. The system includes an exhaust gas recirculation system for an exhaust gas mixed with intake air that is provided to the intake manifold. The humidity of the intake gas is measured and compared to a predetermined value. The system for reducing condensation in the EGR system is controlled based upon the comparison of the measured humidity and the predetermined value.

According to other aspects of the invention, humidity may be measured in the intake manifold of the engine or in the mixing chamber upstream from the intake manifold where the exhaust gases are mixed with intake air.

According to another aspect of the invention, the step of comparing the humidity of the intake gases may further comprise determining whether the temperature of the intake gases are above the dew point. The determination of the dew point of the intake gas may be based upon the calculation of different levels of humidity at different ambient temperatures at a given speed and load of the engine. The calculation of different levels of humidity may rely upon data indicative of the intake manifold pressure, EGR flow, and air/fuel ratio. The temperature of the mixture gases in the intake manifold (IMT) and the dew point of the mixture (IMT$_c$) may be compared so that the EGR is shut off when the IMT is less than IMT$_c$.

According to another aspect of the invention, an exhaust gas recirculation system for a compression ignition engine has a condensation monitoring system. The condensation monitoring system includes a humidity sensor that is included as part of the control circuit. The humidity sensor determines when conditions in the intake manifold are conducive to the formation of condensation. The control circuit stops the EGR system when it is determined that conditions in the intake manifold are conducive to the formation of condensation.

According to other aspects of the EGR system of the present invention, the humidity sensor may be disposed in the intake manifold. Alternatively, the humidity sensor may be disposed in the mixture pipe into which the EGR system provides exhaust gases and a charge air cooler provides intake air.

A further alternative is to locate the humidity sensor to sense ambient humidity.

According to another aspect of the invention, an intake manifold pressure sensor, an EGR flowmeter and a system for determining the air/fuel ratio may be used by the control circuit to calculate the dew point of the mixture of gases in the intake manifold. The calculations may be for a given speed and load for different levels of humidity at different ambient temperatures based upon data received from the intake manifold pressure sensor, the EGR flowmeter and the system for determining the air/fuel ratio.

According to yet another aspect of the invention, the temperature of the mixture of gases in the intake manifold may be designated IMT and the dew point of the mixture may be represented as IMT$_c$ with the EGR being shut off when IMT is less than IMT$_c$.

The above advantages, and other advantages, objects, and features of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
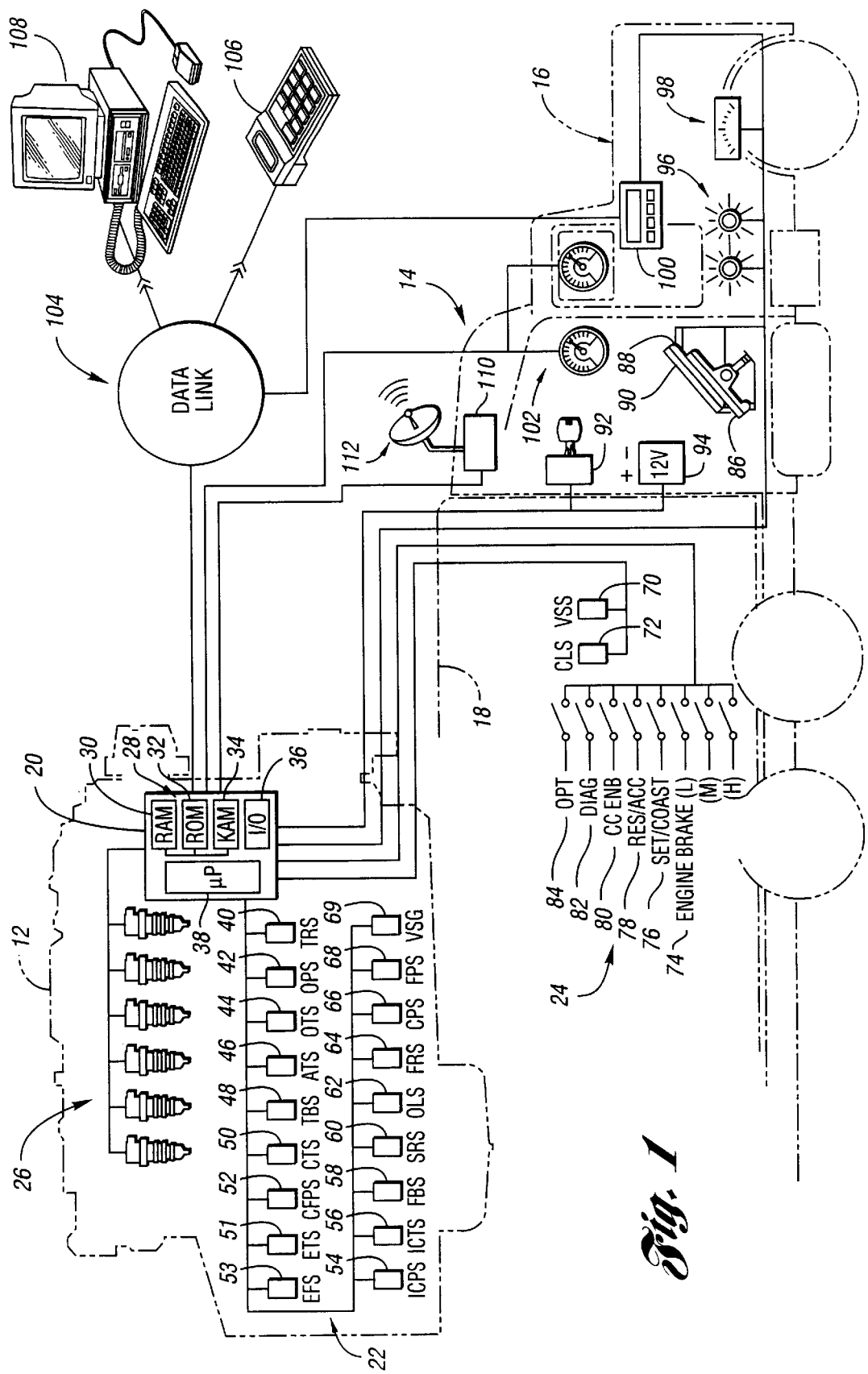
FIG. 1 is a block diagram illustrating one application of a system or method for providing EGR in a multi-cylinder compression ignition engine according to one embodiment of the present invention.

FIG. 1 provides a schematic/block diagram illustrating operation of a system or method for providing EGR in a representative application according to one embodiment of the present invention. System 10 includes a multi-cylinder compression ignition internal combustion engine, such as a diesel engine 12, which may be installed in a vehicle 14 depending upon the particular application. In one embodiment, vehicle 14 includes a tractor 16 and semi-trailer 18. Diesel engine 12 is installed in tractor 16 and interfaces with various sensors and actuators located on engine 12, tractor 16, and semi-trailer 18 via engine and vehicle wiring harnesses as described in further detail below. In other applications, engine 12 may be used to operate industrial and construction equipment, or in stationary applications for driving generators, compressors, and/or pumps and the like.

An electronic engine control module (ECM) 20 receives signals generated by engine sensors 22 and vehicle sensors 24 and processes the signals to control engine and/or vehicle actuators such as fuel injectors 26. ECM 20 preferably includes computer-readable storage media, indicated generally by reference numeral 28 for storing data representing instructions executable by a computer to control engine 12. Computer-readable storage media 28 may also include calibration information in addition to working variables, parameters, and the like. In one embodiment, computer-readable storage media 28 include a random access memory (RAM) 30 in addition to various non-volatile memory such as read only memory (ROM) 32, and keep-alive or non-volatile memory (KAM) 34. Computer-readable storage media 28 communicate with a microprocessor 38 and input/output (I/O) circuitry 36 via a standard control/address bus. As will be appreciated by one of ordinary skill in the art, computer-readable storage media 28 may include various types of physical devices for temporary and/or persistent storage of data which includes solid state, magnetic, optical, and combination devices. For example, computer readable storage media 28 may be implemented using one or more physical devices such as DRAM, PROMS, EPROMS, EEPROMS, flash memory, and the like. Depending upon the particular application, computer-readable storage media 28 may also include floppy disks, CD ROM, and the like.

In a typical application, ECM 20 processes inputs from engine sensors 22, and vehicle sensors/switches 24 by executing instructions stored in computer-readable storage media 28 to generate appropriate output signals for control of engine 12. In one embodiment of the present invention, engine sensors 22 include a timing reference sensor (TRS) 40 which provides an indication of the crankshaft position and may be used to determine engine speed. An oil pressure sensor (OPS) 42 and oil temperature sensor (OTS) 44 are used to monitor the pressure and temperature of the engine oil, respectively.

An air temperature sensor (ATS) 46 is used to provide an indication of the current intake air temperature. A turbo boost sensor (TBS) 48 is used to provide an indication of the boost pressure of a turbocharger which is preferably a variable geometry or variable nozzle turbocharger as described in greater detail below. Coolant temperature sensor (CTS) 50 is used to provide an indication of the coolant temperature. Depending upon the particular engine configuration and application, various additional sensors may be included. For example, engines which utilize exhaust gas recirculation (EGR) according to the present invention preferably include an EGR temperature sensor (ETS) 51 and an EGR flow sensor (EFS) 53. EFS 53 is preferably a hot wire anemometer type sensor which detects a differential temperature of two heated elements to determine the mass flow rate of EGR through the EGR circuit. The heated elements preferably provide pyrolitic cleaning by being heated to a temperature to reduce or prevent soot accumulation. Alternatively, a ΔP sensor may be used to determine the EGR flow rate as described in U.S. patent application Ser. No. 09/641,256 filed Aug. 16, 2000 and assigned to the assignee of the present invention, the disclosure of which is hereby incorporated by reference in its entirety.

Applications utilizing a common rail fuel system may include a corresponding fuel pressure sensor (CFPS) 52. Similarly, an intercooler coolant pressure sensor (ICPS) 54 and temperature sensor (ICTS) 56 may be provided to sense the pressure and temperature of the intercooler coolant. Engine 12 also preferably includes a fuel temperature sensor (FTS) 58 and a synchronous reference sensor (SRS) 60. SRS 60 provides an indication of a specific cylinder in the firing order for engine 12. This sensor may be used to coordinate or synchronize control of a multiple-engine configuration such as used in some stationary generator applications. An EGR cooler and corresponding temperature sensor may also be provided to cool recirculated exhaust gas prior to introduction to the engine intake.

Engine 12 may also include an oil level sensor (OLS) 62 to provide various engine protection features related to a low oil level. A fuel restriction sensor (FRS) 64 may be used to monitor a fuel filter and provide a warning for preventative maintenance purposes. A crankcase pressure sensor (CPS) 66 provides an indication of crankcase pressure which may be used for various engine protection features by detecting a sudden increase in crankcase pressure indicative of an engine malfunction. A fuel pressure sensor (FPS) 68 provides an indication of fuel pressure to warn of impending power loss and engine fueling.

System 10 preferably includes various vehicle sensors/switches 24 to monitor vehicle operating parameters and driver input used in controlling vehicle 14 and engine 12. For example, vehicle sensors/switches 24 may include a vehicle speed sensor (VSS) 70 which provides an indication of the current vehicle speed. A coolant level sensor (CLS) 72 monitors the level of engine coolant in a vehicle radiator. Switches used to select an engine operating mode or otherwise control operation of engine 12 or vehicle 14 may include an engine braking selection switch 74 which preferably provides for low, medium, high, and off selections, cruise control switches 76, 78, and 80, a diagnostic switch 82, and various optional, digital, and/or analog switches 84. ECM 20 also receives signals associated with an accelerator or foot pedal 86, a clutch 88, and a brake 90. ECM 20 may also monitor position of a key switch 92 and a system voltage provided by a vehicle battery 94.

ECM 20 may communicate with various vehicle output devices such as status indicators/lights 96, analog displays 98, digital displays 100, and various analog/digital gauges 102. In one embodiment of the present invention, ECM 20 utilizes an industry standard data link 104 to broadcast various status and/or control messages which may include engine speed, accelerator pedal position, vehicle speed, and the like. Preferably, data link 104 conforms to SAE J1939 and SAE J1587 to provide various service, diagnostic, and control information to other engine systems, subsystems, and connected devices such as display 100. Preferably, ECM 20 includes control logic to determine EGR flow and temperature and to selectively disable the EGR depending upon sensed or calculated intake gas humidity to reduce or eliminate condensation of the recirculated exhaust gas.

A service tool 106 may be periodically connected via data link 104 to program selected parameters stored in ECM 20 and/or receive diagnostic information from ECM 20. Likewise, a computer 108 may be connected with the appropriate software and hardware via data link 104 to transfer information to ECM 20 and receive various information relative to operation of engine 12, and/or vehicle 14.

Figure 2:
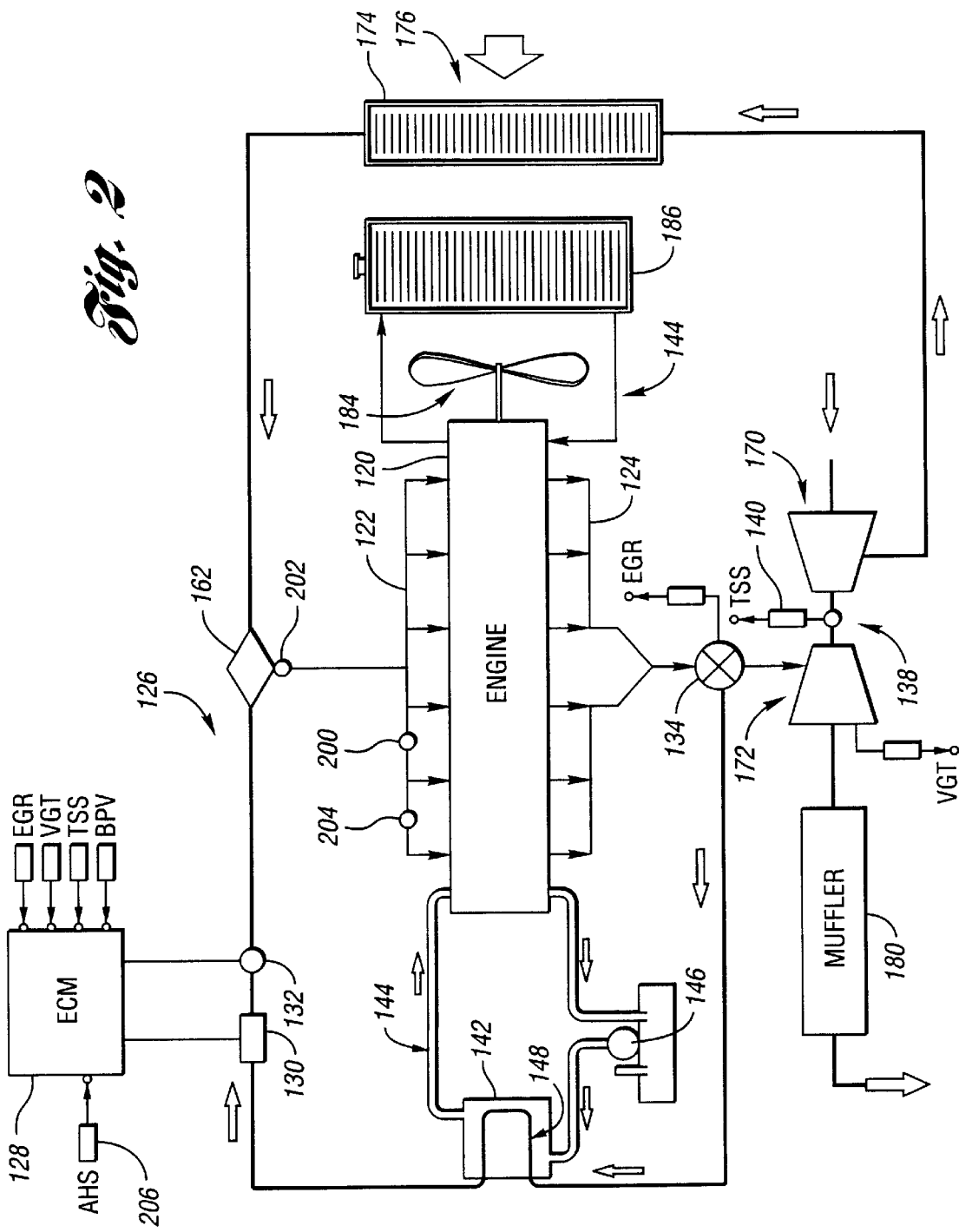
FIG. 2 is a block diagram illustrating a representative EGR circuit for a compression ignition engine according to one embodiment of the present invention.

FIG. 2 is a block diagram illustrating a representative EGR system. Engine 120 includes an intake manifold 122, an exhaust manifold 124, and an exhaust gas recirculation (EGR) system indicated generally by reference numeral 126. An engine control module (ECM) 128 includes stored data representing instructions and calibration information for controlling engine 120. ECM 128 communicates with various sensors and actuators including EGR sensors such as EGR flow sensor 130 and EGR temperature sensor 132. As described above, EGR flow sensor 130 is preferably an anemometer-type sensor. ECM 128 controls EGR system 126 via actuators such as an EGR valve 134. In addition, ECM 128 preferably controls a variable nozzle or variable geometry turbocharger (VGT) 138 and monitors an associated turbo speed sensor 140 and turbo boost sensor as described with reference to FIG. 1.

EGR system 126 preferably includes an EGR cooler 142 which is connected to the engine coolant circuit indicated generally by reference numeral 144. EGR cooler 142 is preferably a full-flow cooler connected in-line with the engine coolant system. EGR cooler 142 may be directly coupled to a corresponding water or coolant pump 146, or may be placed at a different location in the engine cooling circuit depending upon the particular application.

In operation, ECM 128 controls EGR system 126 and VGT 138 based on current operating conditions and calibration information to mix recirculated exhaust gas with charge air via mixer 162 which is preferably a pipe union. The combined charge air and recirculated exhaust gas is then provided to engine 120 through intake manifold 122. In one preferred embodiment, engine 120 is a 6-cylinder compression-ignition internal combustion engine. ECM 128 includes control logic to monitor current engine control parameters and operating conditions to control EGR system 126. During operation of engine 120, intake air passes through compressor portion 170 of VGT 138 which is powered by turbine portion 172 via hot exhaust gasses. Compressed air travels through charge air cooler 174 which is preferably an air-to-air cooler cooled by ram air 176. Charge air passes through cooler 174 to mixer 162 which is preferably a pipe union where it is combined with recirculated exhaust gas based on current engine operating conditions. Exhaust gas exiting engine 120 through exhaust manifold 124 passes through EGR valve 134 where a portion of the exhaust gas may be selectively diverted through EGR cooler 142.

The exhaust gas recirculation system 126 of the engine 120 receives exhaust gases from the exhaust manifold 124 of the engine 120 through the EGR valve 134. A portion of the exhaust gases are directed to the variable geometry turbocharger 138 and another portion of the exhaust gases are ported though the EGR cooler 142. Exhaust gases are then directed through an EGR flow sensor 130 and EGR temperature sensor 132. The exhaust gases then are directed to a charge air mixer that misses the exhaust gas with charge air. The charge air is drawn through the compressor 170 and the charge air cooler 174 were cooled by ram air generally indicated by reference numeral 176. The charge air passes from the charge air cooler 174 to the charge air mixer 162 where it is mixed with the exhaust gas received though the EGR system 126. The mixture of exhaust gas and charge air is directed to the intake manifold 122 of the engine 120. The variable geometry turbocharger 138 may be used to maintain the intake manifold pressure at a higher level than the exhaust manifold pressure.

A humidity sensor 200 could be provided in the intake manifold 122 of the engine 120. The humidity sensor 200 would communicate to the ECM 128 whether the humidity in the intake manifold is at 100% or approaching 100%. If so, the ECM 128 would shut off or disable the EGR system 126. With the EGR system 126 shut off, corrosive hot exhaust gases that contain a substantial amount of water would not be directed into the intake manifold 122. For example, in cold weather conditions and before the engine block and intake manifold 122 is warm, the EGR system 126 normally directs the hot and humid exhaust gases into the intake manifold 122 where they cool and condense when they contact the cold metal surfaces. After the engine 120 warms, the hot and humid exhaust gases and intake air mixture will not condense on the metal surfaces because those walls are now hot and the reduced temperature differential lessens the likelihood of any condensation formation therein.

Alternatively, a humidity sensor 202 could be provided in the charge air mixer 162 or in a conduit or passage connecting the charge air mixer 162 to the intake manifold 122. An advantage of locating the humidity sensor there would be that it could increase the expected service life of the sensor. The sensed level of humidity could be correlated with the engine speed and load for different levels of sensed humidity at different ambient temperatures. Ambient temperature may be sensed by an ambient temperature sensor 46 as previously described. Other relevant factors that could be correlated with the humidity sensed in the charge air mixer 162 to determine the humidity in the intake manifold 122 may comprise the intake manifold pressure that may be sensed by an intake manifold pressure sensor 204, EGR flow sensed by the EGR flow sensor 130, or air fuel ratio as determined by the microprocessor 128. The system could be designed to implement a strategy wherein if the temperature of the exhaust/intake air mixture in the intake manifold (IMT) 122 is less that the dew point for the mixture (IMTc) the EGR system 126 would be shut-off. The trigger point for EGR system shut-off could be adjusted to over protect or under protect the engine depending upon the margin selected for the protective strategy.

The system could also be based upon an ambient humidity sensor 206 that is remotely located from the intake manifold 122 or the air charge mixer 162. The ambient humidity sensor could be calibrated in correlation to other parameters as described in reference to humidity sensor 202 above. The principal advantage of this approach is that the ambient humidity sensor 206 would not be exposed to corrosive exhaust gases. The disadvantage of this approach is the difficulty of accurately calculating the humidity of the exhaust/intake air mixture in the intake manifold 122 without directly measuring humidity within the EGR system 126.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of controlling an internal combustion engine comprising:

providing an exhaust gas recirculation (EGR) system that directs a portion of engine exhaust gases to an intake manifold of the engine;

providing air to the intake manifold;

measuring the humidity of an intake gas provided to the intake manifold;

comparing the humidity of the intake gas to a predetermined value to determine whether the temperature of the intake gases in the intake manifold are above a dew point of the mixture of gases in the intake manifold; and controlling operation of the EUR system based upon the comparison of the measured humidity and the predetermined value if the temperature of the intake gases in the intake manifold are above the dew point of the mixture of gases in the intake manifold.

2. The method of claim 1 wherein the step of measuring the humidity is performed by a humidity sensor disposed in the intake manifold of the engine.

3. The method of claim 1 wherein the step of measuring the humidity is performed by a humidity sensor disposed in a mixing chamber upstream from the intake manifold where exhaust gases are mixed with intake air.

4. The method of claim 1 wherein the step of providing a system for reducing condensation further comprises shutting off the EGR when the humidity of the mixture of gasses in the intake manifold is 100%.

5. The method of claim 1 wherein the dew point of the intake gas is based upon a calculation of humidity in the intake manifold based upon different ambient temperatures and different ambient humidity levels at a given speed and load of the engine.

6. The method of claim 5 wherein the calculation of the level of humidity in the intake manifold is based upon factors relating to the intake manifold pressure, EGR flow, and air fuel ratio.

7. The method of claim 1 wherein the temperature of the mixture of gases in the intake manifold is IMT and the dew point of the mixture is $IMT_c$, wherein the EGR is shut off when IMT is less than $IMT_c$.

8. An exhaust gas recirculation (EGR) system for a compression ignition engine that is provided with a condensation monitoring system, comprising:

a humidity sensor;

a control circuit including the humidity sensor that determines when conditions in the intake manifold are conducive to formation of condensation; and wherein the control circuit stops the EGR system when it is determined that conditions in the intake manifold are conducive to the formation of condensation.

9. The EGR system of claim wherein the humidity sensor is disposed in the intake manifold.

10. The EGR system of claim 7 wherein the humidity sensor is disposed in a mixer pipe into which the EGR system provides exhaust gases and a charge air cooler provides intake air.

11. The system of claim 8 wherein the humidity sensor is disposed to sense ambient humidity.

12. The EGR system of claim 8 further comprising an intake manifold pressure sensor, an EGR flow meter, and a system for determining the air fuel ratio, the dew point of the mixture of gases in the intake manifold at a given speed and load being calculated for different levels of humidity at different ambient temperatures based upon data received from an intake manifold pressure sensor, an EGR flow meter, and a system for determining the air fuel ratio.

13. The system of claim 8 wherein the temperature of the mixture of gases in the intake manifold is IMT and the dew point of the mixture is $IMT_C$, wherein the EGR is shut off when IMT is less than $IMT_C$.

14. A computer readable storage medium having stored data representing instructions executable by a computer to control an internal combustion engine comprising:

providing an exhaust gas recirculation (EGR) system that directs a portion of engine exhaust gases to an intake manifold of the engine;

providing air to the intake manifold;

measuring the humidity of an intake gas provided to the intake manifold;

comparing the humidity of the intake gas to a predetermined value to determine whether the temperature of the intake gases in the intake manifold are above a dew point of the mixture of gases in the intake manifold; and controlling operation of the EGR system based upon the comparison of the measured humidity and the predetermined value if the temperature of the intake gases in the intake manifold are above the dew point of the mixture of eases in the intake manifold.

15. The computer readable storage medium of claim 14 wherein the step of measuring the humidity is performed by a humidity sensor disposed in an intake manifold of the engine.

16. The computer readable storage medium of claim 14 wherein the step of measuring the humidity is performed by a humidity sensor disposed in a mixing chamber upstream from the intake manifold where exhaust gases are mixed with intake air.

17. The computer readable storage medium of claim 14 wherein the step of providing a system for reducing condensation further comprises shutting off the EGR when the humidity of the mixture of gasses in the intake manifold is 100%.

18. An exhaust gas recirculation (EGR) system for a compression ignition engine that is provided with a condensation monitoring system, comprising:

means for sensing humidity;

means for determining when conditions in the intake manifold are conducive to the formation of condensation; and means for stopping the EGR system when it is determined that conditions in the intake manifold conducive to formation of condensation.

19. The EGR system of claim 18 wherein the means for sensing humidity is disposed in the intake manifold.

20. The EGR system of claim 18 wherein the means for sensing humidity sensor is disposed in a mixer pipe into which the EGR system provides exhaust gases and a charge air cooler provides intake air.

* * * * *

UNITED STATES PATENT AND TRADEMARK OFFICE
CERTIFICATE OF CORRECTION

PATENT NO. : 6,725,848 B2
DATED : April 27, 2004
INVENTOR(S) : Ravishankar Ramamurthy et al.

It is certified that error appears in the above-identified patent and that said Letters Patent is hereby corrected as shown below:

Title page,
Item [75], Inventor, "Sameer Bhargara's" last name should be spelled -- Bhargava --.

Column 7,
Line 43, after "claim" insert -- 8 --.
Line 45, delete "7" and insert -- 8 --.

Column 8,
Line 24, delete "eases" and insert -- gases --.
Line 49, after "manifold" insert -- are --.

Signed and Sealed this

Twentieth Day of July, 2004

JON W. DUDAS
*Acting Director of the United States Patent and Trademark Office*